US012574108B2

(12) United States Patent
Szigeti et al.

(10) Patent No.: US 12,574,108 B2
(45) Date of Patent: Mar. 10, 2026

(54) ROUTING DATA THROUGH SATELLITE NETWORK IN ACCORDANCE WITH A DATA SOVEREIGNTY POLICY

(71) Applicant: Cisco Technology, Inc., San Jose, CA (US)

(72) Inventors: Thomas Szigeti, Vancouver (CA); David John Zacks, Vancouver (CA); Jeff Apcar, Willoughby (AU); Robert Edgar Barton, Richmond (CA); Jerome Henry, Pittsboro, NC (US); Vinay Saini, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 508 days.

(21) Appl. No.: 18/104,141

(22) Filed: Jan. 31, 2023

(65) Prior Publication Data

US 2024/0259089 A1    Aug. 1, 2024

(51) Int. Cl.
H04B 7/185      (2006.01)
H04W 12/37      (2021.01)
H04W 40/20      (2009.01)

(52) U.S. Cl.
CPC ........ H04B 7/18565 (2013.01); H04W 12/37 (2021.01); H04W 40/20 (2013.01)

(58) Field of Classification Search
CPC ............ H04B 7/18565; H04B 7/18563; H04B 7/18513; H04W 12/37; H04W 40/20
See application file for complete search history.

(56) References Cited

U.S. PATENT DOCUMENTS

| | | | | |
|---|---|---|---|---|
| 6,226,494 B1 * | 5/2001 | Lundstrom | ........ | H04B 7/18513 |
| | | | | 455/13.1 |
| 10,079,636 B2 * | 9/2018 | Buer | .................. | H04B 7/18534 |
| 12,075,254 B1 * | 8/2024 | Gupta | ................... | H04W 12/37 |
| 2014/0177522 A1 | 6/2014 | Marshack et al. | | |
| 2018/0309508 A1 | 10/2018 | Regan et al. | | |
| 2019/0028182 A1 | 1/2019 | Smyth et al. | | |
| 2019/0238216 A1 * | 8/2019 | Avellan | .............. | H04B 7/18534 |

(Continued)

FOREIGN PATENT DOCUMENTS

| | | |
|---|---|---|
| CN | 110518959 A | 11/2019 |
| CN | 114222345 A | 3/2022 |
| WO | WO2021221842 A1 | 11/2021 |

OTHER PUBLICATIONS

Hummel, Patrik, et al. "Data sovereignty: A review." Big Data & Society 8.1 (2021): 2053951720982012. (Year: 2021).*

(Continued)

*Primary Examiner* — Sharad Rampuria
(74) *Attorney, Agent, or Firm* — Lee & Hayes, P.C.

(57) ABSTRACT

This disclosure describes techniques for complying with a data sovereignty policy of data routed through a satellite network. An example method includes identifying data comprising a data sovereignty label indicating a first geographical region; determining that a coverage region of a satellite includes a first ground station in the first geographical region; determining that coverage region excludes a second ground station in a second geographical region; and based on determining that the coverage area includes the first ground station and excludes the second ground station, transmitting the data to the satellite.

20 Claims, 6 Drawing Sheets

400 ⌐

(56) References Cited

U.S. PATENT DOCUMENTS

| | | | |
|---|---|---|---|
| 2020/0213000 A1 | 7/2020 | Arur et al. | |
| 2022/0247678 A1 | 8/2022 | Atwal et al. | |
| 2022/0311768 A1* | 9/2022 | Hoewisch | H04L 63/0876 |
| 2023/0109635 A1* | 4/2023 | Palermo | H04B 7/18519 |
| | | | 455/13.1 |

OTHER PUBLICATIONS

Xu, Shuang, Xing-Wei Wang, and Min Huang. "Software-defined next-generation satellite networks: Architecture, challenges, and solutions." IEEE Access 6 (2018): 4027-4041. (Year: 2018).*
Search Report and Written Opinion for International Application No. PCT/US2024/013623, Dated May 22, 2024, 12 pages.

* cited by examiner

200

SATELLITE
202

FIRST COVERAGE REGION 204

SECOND COVERAGE REGION 210

SECOND GROUND STATION 208

FIRST GROUND STATION 206

ROUTING DATA THROUGH SATELLITE NETWORK IN ACCORDANCE WITH A DATA SOVEREIGNTY POLICY

TECHNICAL FIELD

The present disclosure relates generally to satellite network routing. In particular cases, transmission of data through a satellite network is compliant with a data sovereignty policy.

BACKGROUND

Modern communication networks are designed to transmit data between various endpoints connected to the networks. Examples of popular communication networks include cellular networks, such as networks operating in accordance with $3^{rd}$ Generation Partnership Program (3GPP) standards. These networks include, for instance, New Radio (NR) and Long Term Evolution (LTE) networks.

Recently, there has been increased interest in implementing communication networks that utilize artificial satellites orbiting the earth. These networks may have improved latency and/or coverage, when compared to existing communication networks. In particular, there is increasing interest in implementing communication networks that utilize low earth orbit (LEO) satellites, which are disposed at a height of about 100 to 2,000 kilometers (km) above the earth. LEO satellites can communicate with devices disposed on the surface of the earth via radio frequency (RF) signaling. In some examples, a device at one location on the surface of the earth can communicate with another device at another location on the surface of the earth by transmitting data to a satellite in a satellite network. The data, for instance, can be relayed to the other device along a path of one or more communicatively coupled satellites in the satellite network. In various examples, satellite networks are not necessarily limited to stationary, terrestrial base stations for operation.

Large-scale deployments of satellite networks, however, face certain challenges. For example, due to the movement of satellites over time, it may be difficult to comply with geographically based data sovereignty policies associated with data transmitted through a satellite network. For example, the General Data Protection Regulation (GDPR) restricts the transmission of sensitive data outside of the European Union (EU). However, it may be difficult to comply with GDPR when sensitive data is transmitted via satellites that move across EU borders.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
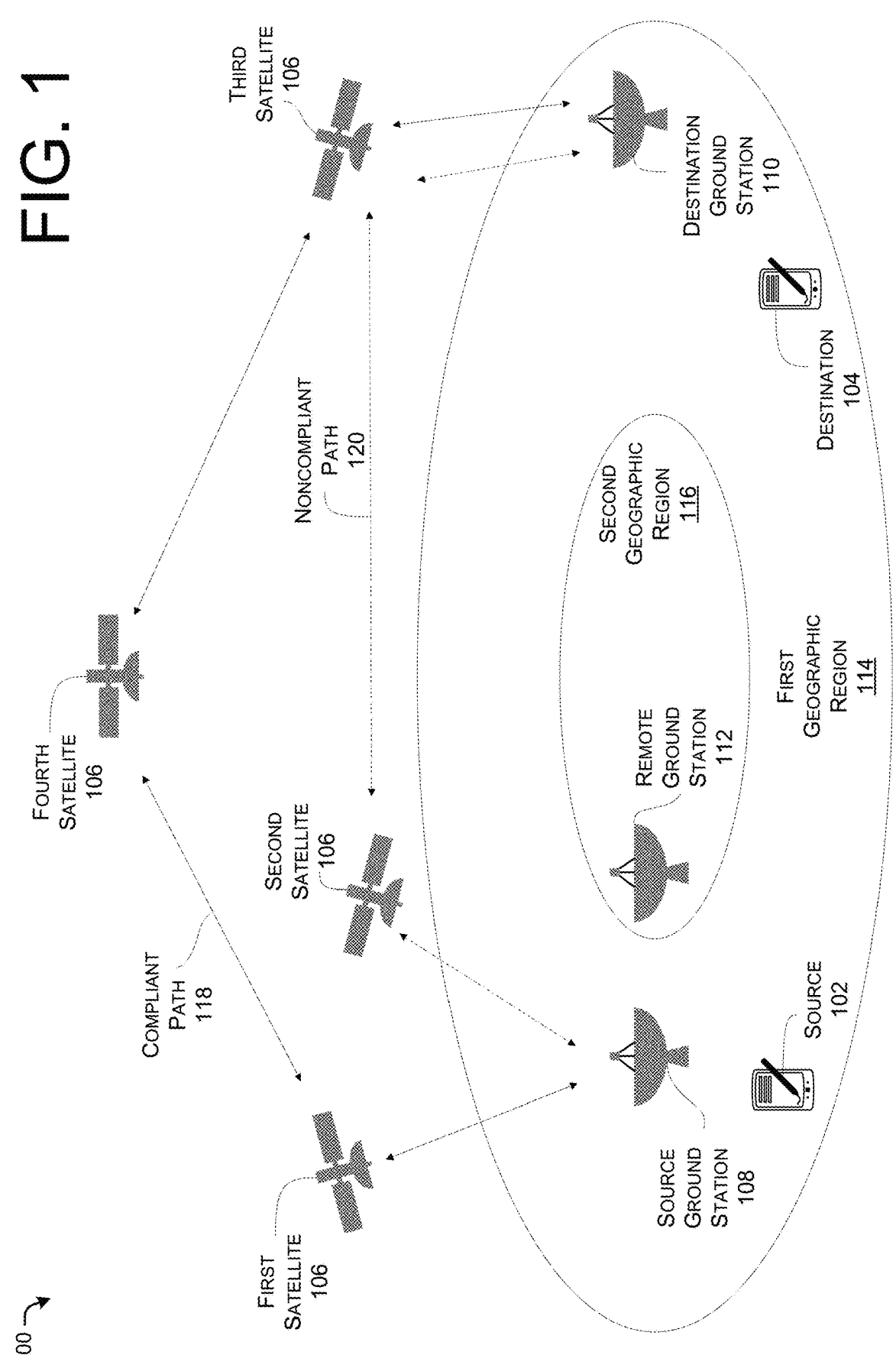
FIG. 1 illustrates an example environment for complying with data sovereignty rules in a satellite network.

This disclosure describes various techniques for directing data through a satellite network while complying with a data sovereignty rule associated with the data. An example method includes identifying data that includes a data sovereignty label indicating a first geographical region. The example method further includes determining that a coverage region of a satellite includes a first ground station in the first geographical region, and determining that the coverage region omits a second ground station in a second geographical region. based on determining that the coverage region includes the first ground station and omits the second ground station, the example method further includes transmitting the data to the satellite.

In some implementations, the data is first data, and the first data is identified by receiving second data from a user equipment in the first geographical region; and generating the first data by adding the data sovereignty label to the second data.

In some cases, determining that the satellite is in the coverage region includes receiving, from the satellite, a connectivity report indicating that the satellite has received a communication signal from the first ground station. For instance, the connectivity report further indicates that the connectivity between the satellite and the first ground station is increasing, steady, or waning.

According to some examples, determining that the coverage area omits the second ground station in the second geographical region includes receiving, from the satellite, a connectivity report omitting an indication of the second ground station.

In some instances, the satellite is a first satellite, the coverage region is a first coverage region, and the method further includes determining that a second coverage region of a second satellite includes the second ground station in the second geographical region. For example, the data is transmitted further based on determining that the second coverage area of the second satellite includes the second ground station in the second geographical region.

In various implementations, the satellite is a first satellite, and the method further includes identifying a destination of the data, the destination being in range of a third ground station in the first geographical region; determining that a second coverage region of a second satellite includes the third ground station in the first geographical region; and adding, to the data, a path label instructing the first satellite to transmit the data along a path including the second satellite.

In some cases, the path is a first path and, the example method further includes identifying a second path including the first satellite and a third satellite; determining that a third coverage area of the third satellite includes the third ground station; and determining that the second path includes a greater number of nodes than the first path.

EXAMPLE EMBODIMENTS

This disclosure describes various techniques for complying with a data sovereignty policy in a satellite network. Various satellites within the satellite network provide reports about the ground stations within their respective coverage areas. A system receiving one or more of the reports can therefore track the coverage regions of the satellites within the satellite network over time. According to particular examples, the system determines that a data sovereignty policy applies to user data addressed to a destination. The system may identify a path through a satellite network that complies with the data sovereignty policy. For example, if the data sovereignty policy prohibits exposure of the user data to devices within a geographical region, the system may identify one or more satellites whose respective coverage regions do not overlap with that geographical region. The system may cause the user data to be transmitted along the identified path. In various implementations, the system may be implemented at a ground station that has received the user data or some other node communicatively coupled to the path. Accordingly, transmission of the user data through the satellite network is compliant with the data sovereignty policy.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for complying with data sovereignty rules in a satellite network. The environment 100 includes a source 102 of user data and a destination 104 of the user data. In various cases, the source 102 and the destination 104 include one or more user equipment (UEs). As used herein, the terms "UE," "user device," "wireless communication device," "communication device," "mobile device," "client device," and "terminal" can be used interchangeably herein to describe any UE that is capable of transmitting/receiving data (e.g., wirelessly) using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over Internet Protocol (IP) (VOIP), VOLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology. In general, a UE can be implemented as any suitable type of computing device configured to communicate over a wired or wireless network, including, without limitation, a mobile phone (e.g., a smart phone), a tablet computer, a laptop computer, a Portable Digital Assistant (PDA), a wearable computer (e.g., electronic/smart glasses, a smart watch, fitness trackers, etc.), an Internet-of-Things (IoT) device, an in-vehicle (e.g., in-car) computer, and/or any similar mobile device, as well as situated computing devices including, without limitation, a television (smart television), a Set-Top-Box (STB), a desktop computer, and the like.

As used herein, the terms "node," "network node," and their equivalents, can refer to any entity within a network that can transmit packets to and/or receive packets from at least one other node. The source 102 and the destination 104 may be nodes within a network. A node may be a device, a software instance, a Virtual Machine (VM), a container, a virtual process, or the like. In some examples, a node may include a grouping of devices or virtual resources, such as security groups, subnetworks, and so forth. In some examples, a node can be a client, a server, or a combination thereof. In some cases, a node can be an endpoint of a flow, such as a source (e.g., the source 102) or a destination (e.g., the destination 104). In some cases, a node can be a network switch, network router, or the like.

In various implementations, the source 102 and the destination 104 are connected to a satellite network. The satellite network may include various satellites 106 orbiting the earth. As used herein, the term "satellite," and its equivalents, refers to a computing device that is orbiting the earth. Each one of the satellites 106 may transmit communication signals into an associated coverage region, and may receive communication signals from other devices within the coverage region. Because the satellites 106 move over time, their respective coverage regions also move over time. The satellites 106, for instance, are nodes within the satellite network. In various cases, the satellites 106 include one or more LEO satellites.

In various cases, the satellites 106 are configured to transmit and/or receive communication signals with one another using wireless communication techniques. In addition, the satellites 106 may be configured to transmit and/or receive communication signals with various ground stations using wireless communication techniques. As used herein, the term "ground station," and its equivalents, refers to a terrestrial device that is configured to transmit communication signals to one or more satellites and to receive communication signals from one or more satellites. In various implementations, the satellites 106 and the ground stations exchange communication signals that are electromagnetic (EM) signals within the RF range. These communication signals may encode various data, such as user data. The source 102, for instance, may transmit and/or receive data with a source ground station 108. Similarly, the destination 104 may transmit and/or receive data with a destination ground station 110. There may also be additional ground stations in the environment 100, such a remote ground station 112.

According to various implementations, the source 102 may transmit user data to the destination 104. The user data may be transmitted in one or more data packets. As used herein, the terms "packet," "data packet," and their equivalents, can refer to a unit of data that is transmitted between two nodes. In various examples, a packet may have a header, which may include control data, and a payload, which may include user data. The header may include information such as an identifier of the source of the packet, an identifier of the destination of the packet, an indication of the type of user data in the payload, or the like. In some cases, a packet can be defined by a particular networking protocol, such as IP, TCP, UDP, or another networking protocol. In some implementations, a packet can be an IPv4 packet, an IPV6 packet, or the like. For instance, the data packets transmitted by the source 102 may each include a header that indicates an IP address of the source 102. In various implementations, the data packets addressed to the destination 104 may each include a header that indicates an IP address of the destination 104.

In various implementations, the user data transmitted by the source 102 is associated with a data sovereignty policy. For example, the user data may include sensitive data which should be exclusively transmitted within a first geographic region 114. For example, the first geographic region 114 may include the EU and the user data may include personal data. To comply with GDPR, an operator of the satellite network may only transmit the user data within the first geographic region 114. For instance, the operator may be non-compliant with GDPR if the user data is transmitted into a second geographic region 116. Accordingly, it would be advantageous to prevent the remote ground station 112, or any other device within the second geographic region 116, from receiving any signal carrying the user data.

Accordingly, in implementations of the present disclosure, a path for transmission of the user data through the satellite network is identified, wherein the path omits nodes that are configured to transmit signals carrying the user data to the remote ground station 112 or any other devices within the second geographic region 116. In some cases, the source ground station 108 determines a compliant path 118 through the satellite network. The compliant path 118 includes one or more of the satellites 106 configured to relay the user data from the source ground station 108 to the destination ground station 110. In addition, a range of each of the satellites 106 in the compliant path 118 omits the remote ground station 112. Accordingly, as the satellites 106 in the compliant path 118 transmit signals carrying the user data from the source ground station 108 to the destination ground station 110, those signals do not reach the remote ground station 112 or any other device within the second geographic region 116.

In various cases, there are multiple possible paths through the satellite network. For example, a noncompliant path 120 also extends between the source ground station 108 and the destination ground station 110. However, the noncompliant path 120 includes a satellite 106 whose range includes the remote ground station 112 in the second geographic region 116. In various cases, the source ground station 108 selects the compliant path 118 over the noncompliant path 120, because the noncompliant path 120 could expose the user data to the remote ground station 112 in the second geographic region 116. Notably, the source ground station 108 may select the compliant path 118 over the noncompliant path 120, even though the compliant path 118 includes a greater number of nodes (satellites 106) than the noncompliant path 120. However, in some cases where multiple compliant paths 118 are available, the source ground station 108 may select the compliant path 118 with the fewest number of nodes.

Upon identifying the compliant path 118, the source ground station 108 may transmit a signal carrying the user data to a satellite on the compliant path 118. The satellite 106, in turn, may transmit another signal carrying the user data to the next node along the compliant path 118. The user data is relayed along the compliant path 118, eventually reaching the destination ground station 110. The destination ground station 110 may transmit the user data to the destination 104. Accordingly, the user data traverses the satellite network while maintaining the data sovereignty policy.

Although the source ground station 108 is described as the entity identifying and/or selecting the compliant path 118, implementations are not so limited. In some cases, the compliant path 118 is identified and/or selected by the source 102 and/or one or more of the satellites 106.

Figure 2:
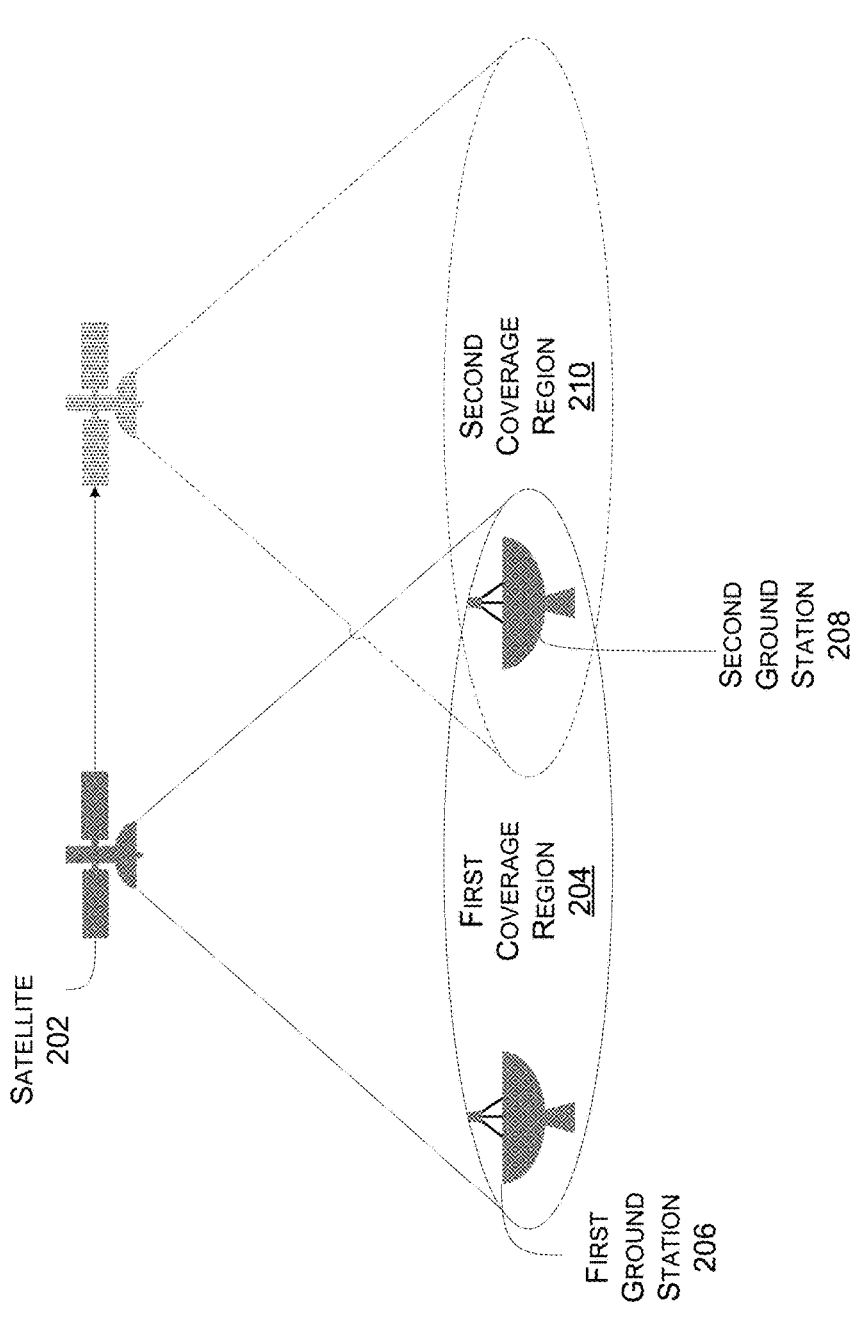
FIG. 2 illustrates an example environment showing the range of a satellite over time.

FIG. 2 illustrates an example environment 200 showing the range of a satellite 202 over time. For example, the satellite 202 may be one of the satellites 106 described above with reference to FIG. 1.

In various implementations, the satellite 202 moves over time. For instance, the satellite 202 orbits the earth along a trajectory. The satellite 202 includes a transceiver and/or transmitter configured to transmit communication signals to other devices, such as other satellites or ground stations. These communication signals can be received and interpreted within a range of distances from the transceiver and/or transmitter. The range, for instance, may depend on the shape of the transceiver and/or transmitter, an angle at which the satellite 202 is disposed, an energy and/or power at which the communication signals are emitted from the satellite 202, the presence of interference (e.g., weather patterns, objects, etc.) along the transmission path, and the like. Devices outside of the range may be unable to receive the communication signals. In some cases, devices outside of the range can receive the communication signals, but the communication signals are uninterpretable. For example, the communications signals as-received by devices outside of the range may be sufficiently degraded, such that the devices may be unable to recover the original data encoded into the communication signals.

At a first time, the satellite 202 is in a first position associated with a first coverage region 204. The first coverage region 204 may be defined as a volume within the range of the satellite 202. In various cases, the first coverage region 204 may include an area on the surface of the earth, wherein devices located within that area are within the range of transmissions emitted by the satellite 202. For instance, a first ground station 206 and a second ground station 208 may be located within the first coverage region 204.

However, the satellite 202 is in motion, even at the first time. At a second time, the satellite 202 is in a second position associated with a second coverage region 210. The second coverage region 210 is different than the first coverage region 204. For example, the second ground station 208 is in the second coverage region 210, but the first ground station 206 is omitted from the second coverage region 210.

In various implementations of the present disclosure, a path through a satellite network including the satellite 202 is identified and/or selected based on the first coverage region 204 and/or the second coverage region 210. For example, a source may transmit user data to a destination, wherein the user data may be associated with a data sovereignty policy indicating that the user data should not be transmitted to devices within a geographic region including the first ground station 206. Because the first coverage region 204 includes the first ground station 206 at the first time, the satellite 202 may be omitted from the path if the path is selected at the first time. However, if the path is selected at the second time, the satellite 202 may be included in the path because the second coverage region 210 omits the first ground station 206. Accordingly, exposure of the user data to the first ground station 206 (or any other device within the geographic region) can be prevented.

Figure 3:
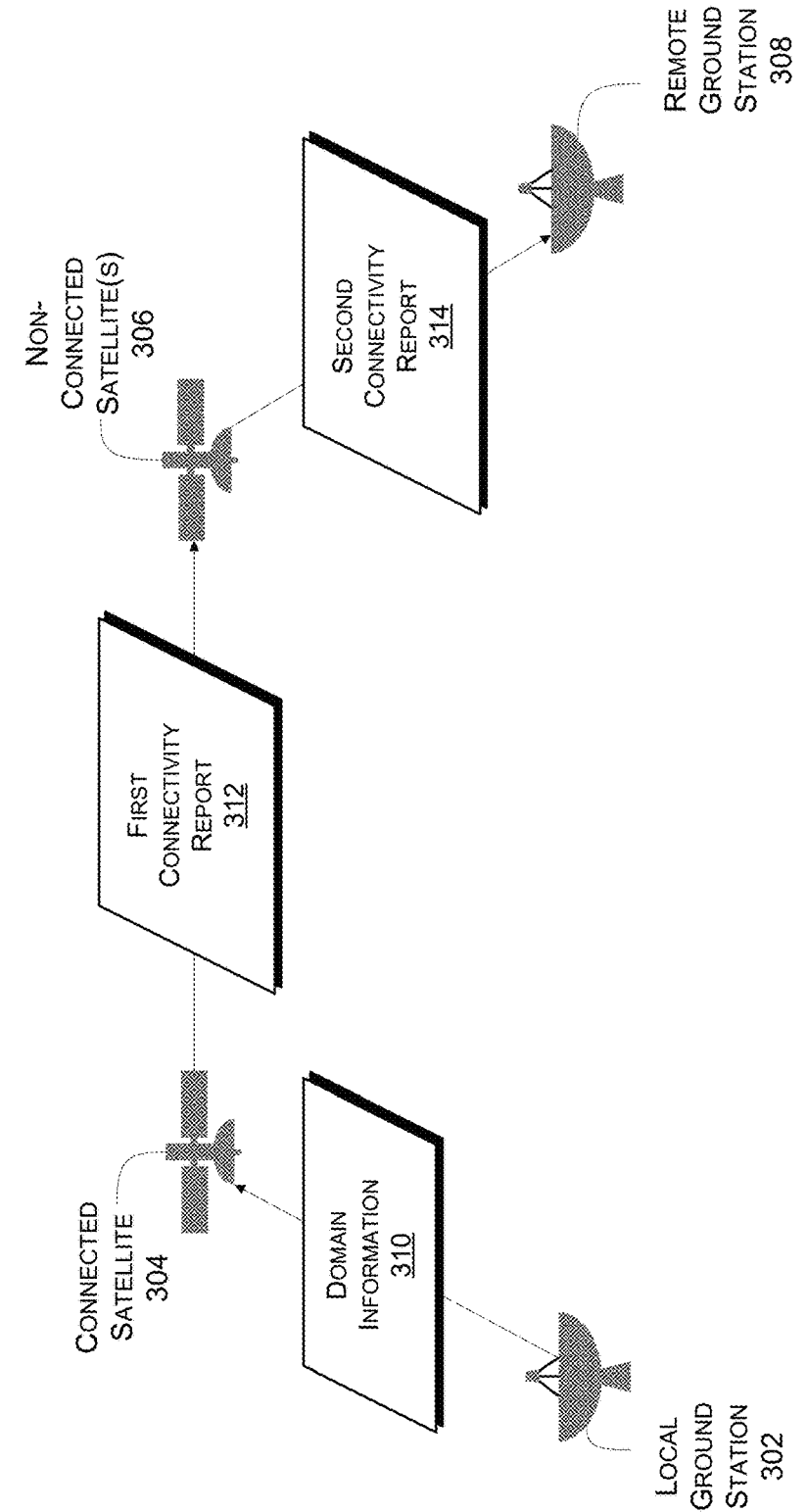
FIG. 3 illustrates example signaling for determining coverage areas of individual satellites within a satellite network.

FIG. 3 illustrates example signaling 300 for determining coverage areas of individual satellites within a satellite network. The signaling 300 is between a local ground station 302, a connected satellite 304, one or more non-connected satellites 306, and a remote ground station 308. The connected satellite 304 and the non-connected satellite(s) 306 may be satellites 106 described above with respect to FIG. 1. In some cases, the local ground station 302 and the remote ground station 308 are included in the source ground station 108, the destination ground station 110, and the remote ground station 112 described above with reference to FIG. 1.

The local ground station 302 is in the range of the connected satellite 304. In some implementations, a different entity may be responsible for selecting a path through a satellite network including the connected satellite 304 and/or the non-connected satellite(s) 306. For example, the remote ground station 308 may be responsible for determining whether to include the connected satellite 304 in a path for the transmission of sensitive user data through the satellite network. Accordingly, the signaling 300 can provide a mechanism by which the remote ground station 308 determines what devices are within range of the connected satellite 304.

In various implementations, the local ground station 302 transmits domain information 310 to the connected satellite 304. The domain information 310, in various implementations, identifies one or more features of the volume in which the domain information 310 is transmitted. For example, the domain information 310 may include an identifier of the local ground station 302 (e.g., a string or code uniquely assigned to the local ground station 302 among ground stations operating in the network), a location of the local ground station 302, an estimated transmission distance of the domain information 310, a geographic region in which the local ground station 302 is located (e.g., the country or state in which the local ground station 302 is located), identifiers of one or more devices communicatively coupled to the local ground station 302 (e.g., identifiers of other satellites that have transmitted communication signals to the local ground station 302 within a threshold time period), or any combination thereof. In some cases, the local ground station 302 broadcasts the domain information 310, such that other satellites or devices also receive the domain information 310. For instance, the local ground station 302 may broadcast the domain information 310 periodically (e.g., once every second, ten seconds, or minute). The local ground station 302 may transmit the domain information 310 a distance that corresponds to the transmission distance of the connected satellite 304, such that the broadcast radius of the local ground station 302 may be within a threshold distance of the transmission distance of the connected satellite 304. Thus, by receiving the domain information 310 from the local ground station 302, the connected satellite 304 may presume that the local ground station 302 is within the coverage region of the connected satellite 304.

In some examples, the local ground station 302 transmits the domain information 310 in response to receiving a request from the connected satellite 304. In some implementations, the domain information 310 is encoded and encrypted within a communication signal transmitted by the local ground station 302. For instance, the connected satellite 304 may transmit an encryption key to the local ground station in the request, which the local ground station 302 may use to encrypt the domain information 310. In some implementations, the local ground station 302 encrypts the domain information 310 using an encryption key, and the connected satellite 304 decrypts the domain information 310 using a decryption key, wherein the encryption key and decryption key are predetermined by devices within the satellite network.

The connected satellite 304 transmits a first connectivity report 312 based on the domain information 310. The connected satellite 304 may transmit the first connectivity report 312 periodically or in response to detecting a change in devices included within the coverage region of the connected satellite 304 (e.g., in response to determining that a ground station has newly entered the coverage region or a ground station has left the coverage region). In some cases, the first connectivity report 312 is further based on other domain information received from other devices (e.g., other ground stations) in the coverage area of the connected satellite 304. In various implementations, the connectivity report 312 includes information about the coverage area of the connected satellite 304. In some examples, the connectivity report 312 indicates identifier(s) of the ground station(s) within the coverage region, location(s) of the ground station(s) within the coverage region, estimated transmission distance(s) of the ground station(s), geographic region(s) in which the ground station(s) are located, identifier(s) of devices connected to the ground station(s), or any combination thereof.

In some cases, the first connectivity report 312 further indicates about how the ground station(s) relate to the movement of the coverage region of the connected satellite 304. The first connectivity report 312 may indicate whether connectivity between the local ground station 302 and the connected satellite 304 is waning or increasing. For instance, the connected satellite 304 may determine that the center of the coverage region of the connected satellite 304 is moving toward the local ground station 302, away from the local ground station 302, or laterally to the local ground station 302, and may indicate this relationship in the first connectivity report 312. In some cases, the connected satellite 304 determines the relationship between the coverage region and the location of the local ground station 302 based on a signal quality of the domain information 310.

In various implementations, the first connectivity report 312 additionally indicates information about the coverage areas of other satellites in the satellite network. For example, the connected satellite 304 may receive connectivity reports from other satellites (e.g., the non-connected satellite(s) 306) in the coverage region of the connected satellite 304, which may indicate the domain information transmitted by the other satellites. Thus, the first connectivity report 312 may indicate broader coverage trends within the satellite network.

In some implementations, the remote ground station 308 is also located within the coverage area of the connected satellite 304. Accordingly, the connected satellite 304 may transmit the connectivity report 312 directly to the remote ground station 308. However, in some cases, the remote ground station 308 is outside of the coverage region of the connected satellite 304. Thus, the connected satellite 304 may additionally transmit the first connectivity report 312 to the non-connected satellite(s) 306 within the coverage area of the connected satellite 304.

The non-connected satellite(s) 306 may transmit a second connectivity report 314 based on the first connectivity report 312. The second connectivity report 314 may indicate information about the coverage region of the connected satellite 304. At least one coverage region of the non-connected satellite(s) 306 may include the second ground station 308, such that the second ground station 308 receives the second connectivity report 314 and can thereby gain insight into the coverage area of the connected satellite 304. In addition, the second connectivity report 314 may include information about the coverage areas of the non-connected satellite(s) 306, as well as other satellites within the satellite network. Each one of the non-connected satellite(s) 306 may transmit the second connectivity report 314 periodically or in response to detecting a change in devices within coverage regions indicated by the second connectivity report 314. Accordingly, the remote ground station 308 may identify that the local ground station 302 is within the coverage area of the connected satellite 304, even when the remote ground station 308 is not necessarily within the coverage region of the connected satellite 304.

In various cases, the remote ground station may determine whether to transmit user data along a path through the satellite network that includes the connected satellite 304 based on the presence of the local ground station 302 within the coverage region of the connected satellite 304. For example, if the local ground station 302 is within a geographic region that is noncompliant with a data sovereignty policy of the user data, the remote ground station 308 may not transmit the user data along the path including the connected satellite 304. However, in some cases in which the local ground station 302 is within a geographic region that is compliant with the data sovereignty policy, then the remote ground station 308 may transmit the user data along the path including the connected satellite 304.

Figure 4:
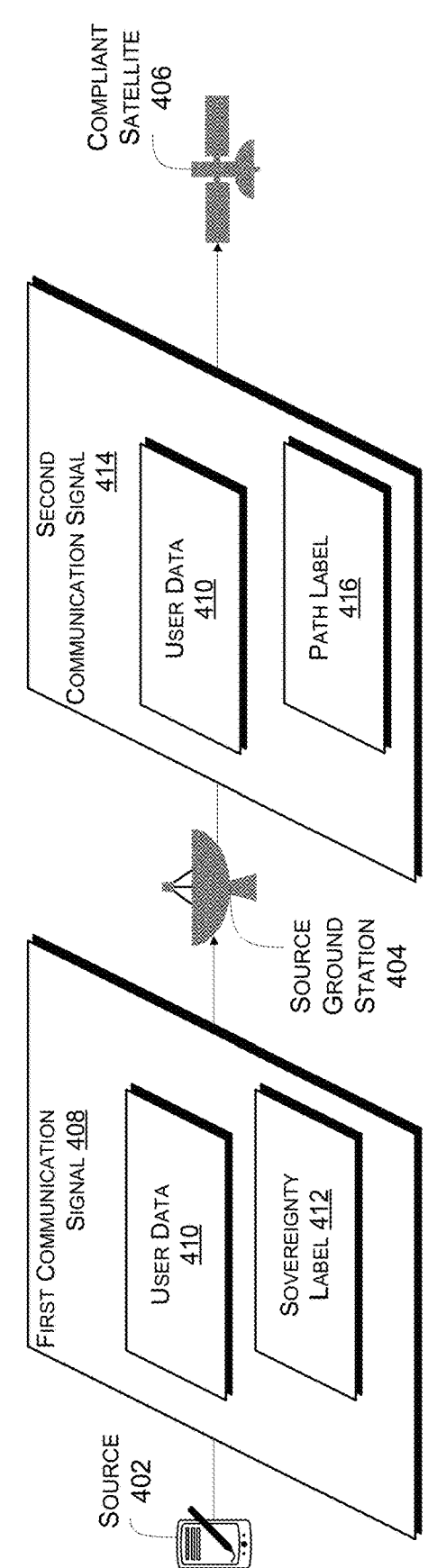
FIG. 4 illustrates example signaling for transmitting data through a satellite network in accordance with a data sovereignty policy.

FIG. 4 illustrates example signaling 400 for transmitting data through a satellite network in accordance with a data sovereignty policy. The signaling 400 is between a source 402 (e.g., the source 102 described above with reference to FIG. 1), a source ground station 404 (e.g., the source ground station 108 described above with reference to FIG. 1), and a compliant satellite 406 (e.g., one of the satellites 106 described above with reference to FIG. 1).

The source 402 transmits a first communication signal 408 to the source ground station 404. The first communication signal 408 may be a wireless (e.g., RF signal) that encodes various data. For instance, the first communication signal 408 encodes user data 410 and a sovereignty label 412. In various implementations, the user data 410 is addressed to a destination that is in, or connected to, a satellite network including the compliant satellite(s) 406. For example, the user data 410 may include voice data, video data, internet browsing data, and the like. In some cases, the user data 410 is encrypted in the first communication signal 408. The sovereignty label 412 may indicate whether the user data 410 is associated with a data sovereignty policy. In some cases, the sovereignty label 412 identifies an applicable data sovereignty policy. For example, the sovereignty label 412 may indicate that transmission of the user data 410 should be restricted to devices within a particular geographical region (e.g., country).

The source ground station 404 may identify the compliant satellite 406 based on the sovereignty label 412. In various implementations, the source ground station 404 may determine that a coverage region of the compliant satellite 406 includes at least a portion of the particular geographical region and omits a portion of one or more other geographical regions. Thus, if the user data 410 is transmitted to the compliant satellite 406, or transmitted by the compliant satellite 406, the user data 410 will not be exposed to devices outside of the particular geographical region.

The source ground station 404 may transmit a second communication signal 414 to the compliant satellite 406. In various implementations, the second communication signal 414 includes the user data 410. In turn, the compliant satellite 406 may transmit the user data 410 toward the destination. For example, the compliant satellite 406 may transmit the user data 410 along a path including one or more additional satellites and/or one or more ground stations that forward the user data 410 to the destination.

In some implementations, the source ground station 404 specifies one or more additional nodes along a compliant path toward the destination that includes the compliant satellite 406. For instance, the source ground station 404 may identify the path by determining one or more satellites in the satellite network that are compliant with the data sovereignty policy and can relay the user data 410 to a ground station connected to the destination. The source ground station 404 may identify these satellite(s) by determining that their respective coverage region(s) include portion(s) of the particular geographical region and omit portions of other geographical regions. In some cases, the source ground station 404 may select one path, among multiple paths that are compliant with the data sovereignty policy. For instance, the source ground station 404 may select the compliant path including the fewest number of hops, nodes, or satellites. The source ground station 404 may indicate the identified path in a path label 416 included in the second communication signal 414. In various implementations, the compliant satellite 406 may recognize the next node (e.g., a satellite or a ground station) along the path using the path label 416, and may forward the user data 410 to the next node.

Figure 5:
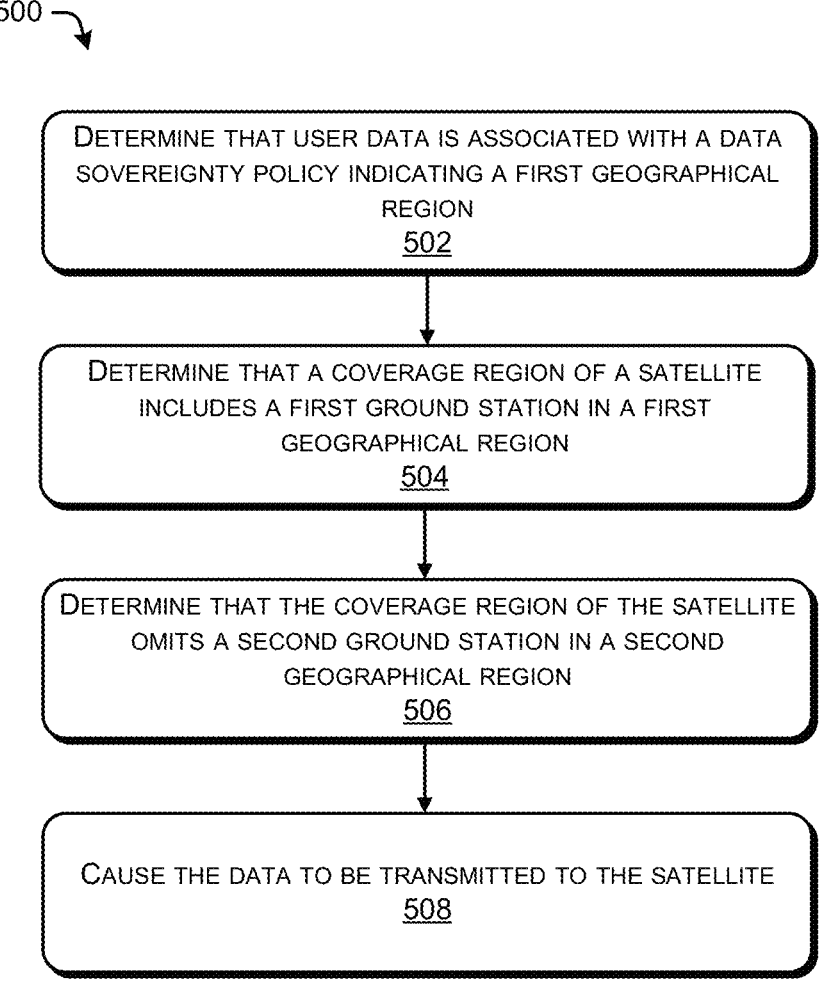
FIG. 5 illustrates a process for directing user data through a satellite network in accordance with a data sovereignty policy.

FIG. 5 illustrates a process 500 for directing user data through a satellite network in accordance with a data sovereignty policy. The process 500 is performed by an entity, which may include at least one processor, a computing device (e.g., a mobile device, server, IoT device, etc.), a ground station, a satellite, or any combination thereof.

At 502, the entity determines that user data is associated with a data sovereignty policy indicating a first geographical region. In various implementations, the user data includes a label indicating the applicability of the data sovereignty policy. The entity may, in some cases, add the label to the user data. According to some cases, compliance with the data sovereignty policy requires transmission of the user data exclusively within the first geographical region.

At 504, the entity determines that a coverage region of a satellite includes a first ground station in a first geographical region. For instance, the entity may determine that the satellite is in range of the first ground station. In various implementations, the entity receives a connectivity report indicating that the satellite has received a communication signal from the first ground station. For instance, the connectivity report indicates that the satellite has received the communication signal within a threshold time period (e.g., the last second, the last ten seconds, the last minute, etc.). In some implementations, the connectivity report further indicates whether connectivity between the satellite and the first ground station is increasing, steady, or waning. For instance, the satellite determines the status of the connectivity based on a signal quality of the communication signal it received from the first ground station.

At 506, the entity determines that that the coverage region of the satellite omits a second ground station in a second geographical region. In some implementations, the entity determines that the connectivity report omits an indication of the second ground station. For example, the connectivity report may indicate that the satellite has not received a communication signal from the second ground station within a predetermined time period.

At 508, the entity causes the user data to be transmitted to the satellite. For example, based on 504 and 506, the entity may determine that a path including the satellite complies with the data sovereignty policy. Accordingly, transmission of the user data to the satellite will comply with the data sovereignty policy. In some implementations, the entity identifies a path through the satellite network to a destination of the user data, wherein the path includes the satellite and one or more additional nodes. In some cases, the entity adds a path label to the user data before transmission, wherein the path label indicates the nodes along the path. In cases where the entity identifies multiple paths that comply with the data sovereignty policy, the entity may select a path with the fewest number of hops (e.g., nodes), the lowest congestion, or some combination thereof.

Figure 6:
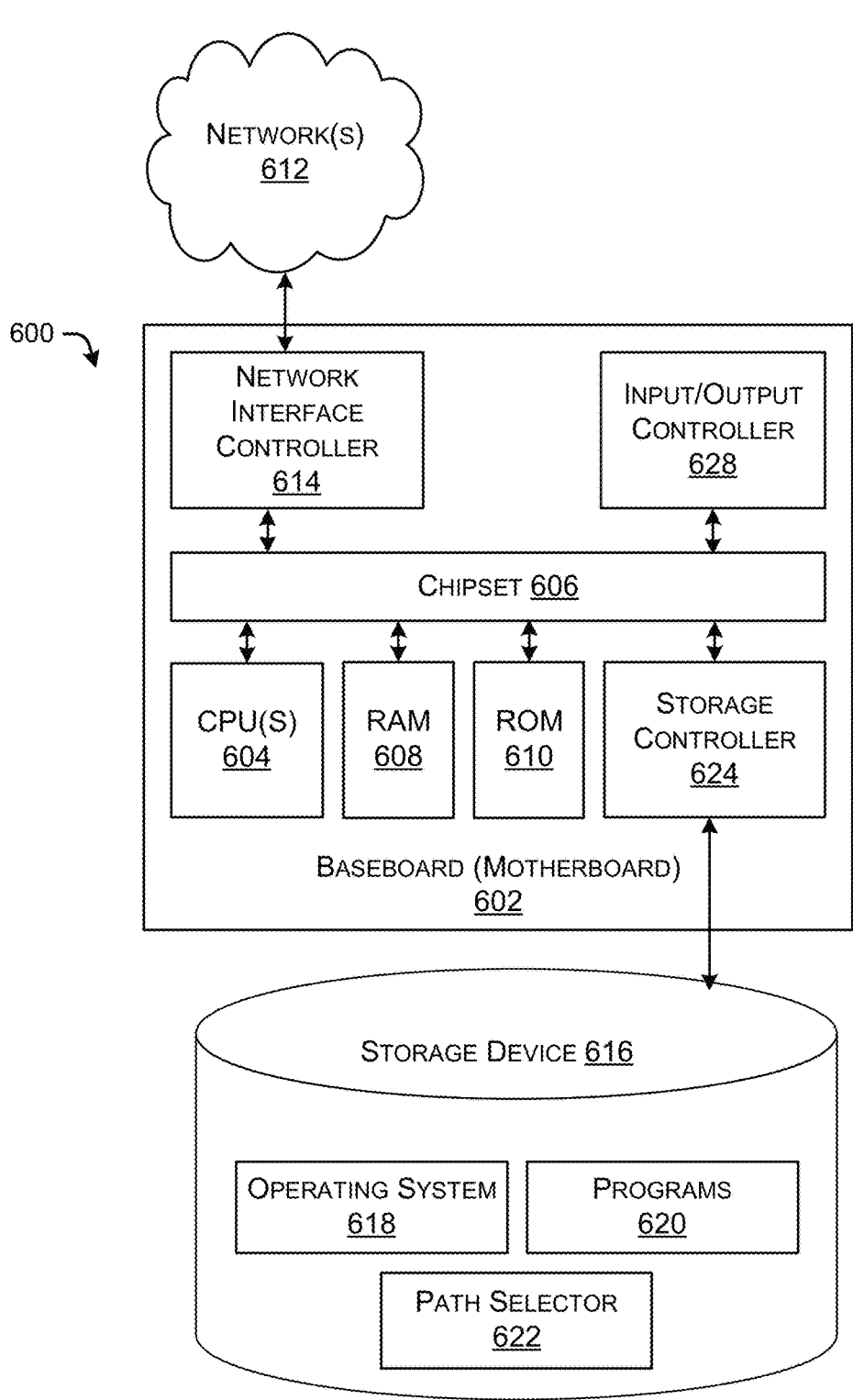
FIG. 6 shows an example computer architecture for a server computer capable of executing program components for implementing any of the functionality described herein.

FIG. 6 shows an example computer architecture for a server computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 600 may, in some examples, correspond to a network node (e.g., the source ground station 108) described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a random-access memory (RAM) 608, used as the main memory in the computer 600. The chipset 606 can further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through one or more networks 612. The chipset 606 can include functionality for providing network connectivity through a network interface controller (NIC) 614, such as a gigabit Ethernet adapter. The NIC 614 is capable of connecting the computer 600 to other computing devices over the network 612. It should be appreciated that multiple NICs 614 can be present in the computer 600, connecting the computer 600 to other types of networks and remote computer systems. In some instances, the NICs 614 may include at least on ingress port and/or at least one egress port.

The computer 600 can be connected to a storage device 616 that provides non-volatile storage for the computer. The storage device 616 can store an operating system 618, programs 620, and data, which have been described in greater detail herein. For example, the storage device 616 stores a path selector 622 which, when executed by the CPU(s) 604, causes the CPU(s) 604 to perform various operations, such as identifying a data sovereignty policy, identifying one or more compliant satellites in a satellite network, identifying one or more compliant paths through the satellite network, and selecting a satellite and/or path. The storage device 616 can be connected to the computer 600 through a storage controller 624 connected to the chipset 606. The storage device 616 can consist of one or more physical storage units. The storage controller 624 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 600 can store data on the storage device 616 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 616 is characterized as primary or secondary storage, and the like.

For example, the computer 600 can store information to the storage device 616 by issuing instructions through the storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 616 by detecting the physical states or characteristics of one or more particular locations within the physical storage units.

In addition to the storage device 616 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by any network node described herein may be supported by one or more devices similar to computer 600. Stated otherwise, some or all of the operations performed by a network node may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 616 can store an operating system 618 utilized to control the operation of the computer 600. According to one embodiment, the operating system comprises the LINUX™ operating system. According to another embodiment, the operating system includes the WINDOWS™ SERVER operating system from MICROSOFT Corporation of Redmond, Washington. According to further embodiments, the operating system can comprise the UNIX™ operating system or one of its variants. It should be appreciated that other operating systems can also be utilized. The storage device 616 can store other system or application programs and data utilized by the computer 600.

In one embodiment, the storage device 616 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

As illustrated in FIG. 6, the storage device 616 stores programs 620, which may include one or more processes, as well as the path selector 622 that includes instructions for identifying one or more satellites that comply with a data sovereignty policy. The process(es) may include instructions that, when executed by the CPU(s) 604, cause the computer 600 and/or the CPU(s) 604 to perform one or more operations described herein.

The computer 600 can also include one or more input/output controllers 628 for receiving and processing input from a number of input devices, such as a keyboard, a mouse, a touchpad, a touch screen, an electronic stylus, or other type of input device. Similarly, an input/output controller 628 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
identifying data comprising a data sovereignty label indicating a first geographical region;
receiving, from a first satellite in orbit, a first connectivity report;
based on the first connectivity report:
determining that a coverage region of the first satellite comprises a first ground station in the first geographical region; and
determining that coverage region excludes a second ground station in a second geographical region;
receiving, from the first satellite or a second satellite in orbit, a second connectivity report;
based on the second connectivity report, determining that a coverage region of the second satellite comprises the second ground station;
identifying a path through a satellite network comprising the first satellite and omitting the second satellite;
generating a signal by encoding the data and a path label instructing the first satellite to forward the data along the path; and
transmitting the signal along the path.

2. The method of claim 1, the data being first data, wherein identifying the first data comprising the data sovereignty label indicating the first geographical region comprises:
receiving second data from a user equipment in the first geographical region; and
generating the first data by adding the data sovereignty label to the second data.

3. The method of claim 1, wherein the first connectivity report indicates that the first satellite has received a communication signal from the first ground station.

4. The method of claim 3, wherein the first connectivity report further indicates that a connectivity between the first satellite and the first ground station is increasing, steady, or waning.

5. The method of claim 1, wherein determining that the coverage region of the first satellite excludes the second ground station in the second geographical region comprises:
determining that the first connectivity report omits an indication of the second ground station.

6. The method of claim 1, further comprising:

identifying a destination of the data, the destination being in range of a third ground station in the first geographical region; and determining that a coverage region of a third satellite comprises the third ground station in the first geographical region, wherein the path further comprises the third satellite.

7. The method of claim 6, the path being a first path, the method further comprising:

identifying a second path comprising the first satellite and a fourth satellite;

determining that a coverage region of the fourth satellite comprises the third ground station; and determining that the second path comprises a greater number of nodes than the first path.

8. The method of claim 1, wherein the first satellite comprises a first LEO satellite, and wherein the second satellite comprises a second LEO satellite.

9. The method of claim 1, wherein transmitting the signal along the path comprises transmitting the signal to a third ground station along the path or to a third satellite along the path.

10. A system, comprising:

a transceiver configured to:

receive, from a first satellite in orbit, a first connectivity report; and receive, from the first satellite or a second satellite in orbit, a second connectivity report;

at least one processor; and one or more non-transitory media storing instructions that, when executed by the system, cause the system to perform operations comprising:

identifying data comprising a data sovereignty label indicating a first geographical region;

based on the first connectivity report:

determining that the first satellite is in range of a first ground station in the first geographical region; and determining that the first satellite is out of range of a second ground station in a second geographical region; and based on the second connectivity report, determining that the second satellite is in range of the second ground station;

identifying a path through a satellite network comprising the first satellite and omitting the second satellite;

generating encoded data by encoding the data and a path label instructing the first satellite to forward the data along the path; and causing the transceiver to transmit, a signal comprising the encoded data.

11. The system of claim 10, the data being first data, the signal being a first signal, wherein the transceiver is configured to receive, from a user equipment in the first geographical region, a second signal encoding second data, and wherein identifying the first data comprising the data sovereignty label indicating the first geographical region comprises generating the first data by adding the data sovereignty label to the second data.

12. The system of claim 10, wherein the first connectivity report further indicates that the connectivity between the first satellite and the first ground station is increasing, steady, or waning.

13. The system of claim 10, the operations further comprising:

identifying a destination of the data, the destination being in range of a third ground station in the first geographical region;

determining that a third satellite is in range of the third ground station in the first geographical region, wherein the path further comprises the third satellite.

14. The system of claim 13, the path being a first path, the operations further comprising:

identifying a second path comprising the first satellite and a fourth satellite;

determining that the fourth satellite is in range of the third ground station; and determining that the second path comprises a greater number of nodes than the first path.

15. The system of claim 10, wherein the system comprises a third ground station in the first geographical region.

16. The system of claim 10, wherein the first satellite comprises a first LEO satellite, and wherein the second satellite comprises a second LEO satellite.

17. The system of claim 10, wherein the transceiver is configured to transmit the signal to a third ground station along the path or to a third satellite along the path.

18. A first ground station, comprising:

a transceiver configured to:

receive first signals from low earth orbit (LEO) satellites in a satellite network;

receive a second signal from a user equipment; and transmit a third signal to at least one first satellite among the LEO satellites;

at least one processor; and memory storing instructions that, when executed by the at least one processor, cause the at least one processor to perform operations comprising:

identifying, based on the second signal, a data sovereignty label indicating a first geographical region;

identifying, based on the second signal, a destination of user data encoded in the second signal;

identifying a second ground station connected to the destination of the data, the second ground station being in the first geographical region;

determining, based on connectivity reports encoded in the first signals, that the at least one first satellite is in range of the second ground station;

determining, based on the connectivity reports, that the at least one first satellite is out of range of a third ground station in a second geographical region;

determining, based on the connectivity reports, that at least one second satellite among the LEO satellites is in range of the third ground station in the second geographical region;

identifying a path through the satellite network comprising the second ground station and the at least one first satellite, the path omitting the at least one second satellite;

encoding, in the third signal, the user data and a path label instructing the at least one first satellite to forward the user data along the path.

19. The first ground station of claim 18, wherein determining, based on the connectivity reports, that the at least one first satellite is out of range of the third ground station in the second geographical region comprises determining, based on the connectivity reports, that the at least one first satellite has not received a communication signal from the third ground station within a predetermined time period.

20. The first ground station of claim 18, the path being a first path, the operations further comprising:

identifying a second path through the satellite network comprising at least one third satellite among the LEO satellites and the second ground station; and determining that the second path comprises a greater number of nodes than the first path.

\* \* \* \* \*